(12) United States Patent
Paolini, Jr. et al.

(10) Patent No.: US 9,436,056 B2
(45) Date of Patent: Sep. 6, 2016

(54) COLOR ELECTRO-OPTIC DISPLAYS

(71) Applicant: E INK CORPORATION, Billerica, MA (US)

(72) Inventors: Richard J. Paolini, Jr., Framington, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/174,390

(22) Filed: Feb. 6, 2014

(65) Prior Publication Data

US 2014/0362131 A1 Dec. 11, 2014

Related U.S. Application Data

(60) Provisional application No. 61/761,333, filed on Feb. 6, 2013, provisional application No. 61/761,879, filed on Feb. 7, 2013.

(51) Int. Cl.
*G02F 1/167* (2006.01)
*G02F 1/1335* (2006.01)
*G09G 3/20* (2006.01)
*G09G 3/30* (2006.01)

(52) U.S. Cl.
CPC .......... *G02F 1/167* (2013.01); *G02F 1/133514* (2013.01); *G09G 3/2003* (2013.01); *G09G 3/30* (2013.01)

(58) Field of Classification Search
CPC ...... G09G 3/2003; G09G 3/30; G09G 3/344; G09G 2310/0235; G09G 2310/0272; G02F 1/167; G02F 1/133514; G02F 2001/1678

USPC ........................................................ 345/697
See application file for complete search history.

(56) References Cited

U.S. PATENT DOCUMENTS

| | | | |
|---|---|---|---|
| 4,418,346 | A | 11/1983 | Batchelder |
| 5,424,006 | A | 6/1995 | Murayama |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II |
| 5,885,483 | A | 3/1999 | Hao |
| 6,017,584 | A | 1/2000 | Albert |
| 6,054,071 | A | 4/2000 | Mikkelsen, Jr. |
| 6,055,091 | A | 4/2000 | Sheridon |
| 6,097,531 | A | 8/2000 | Sheridon |
| 6,117,362 | A | 9/2000 | Yen |
| 6,128,124 | A | 10/2000 | Silverman |
| 6,130,774 | A | 10/2000 | Albert |
| 6,137,467 | A | 10/2000 | Sheridon |
| 6,144,361 | A | 11/2000 | Gordon, II |
| 6,147,791 | A | 11/2000 | Sheridon |
| 6,172,798 | B1 | 1/2001 | Albert |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Tom Sheng
(74) *Attorney, Agent, or Firm* — David J. Cole

(57) ABSTRACT

A color filter array or a backplane for a color display has first and second areas with substantially different optical properties. The invention also provides a color filter with a low resistivity. The invention further provides a color display utilizing fluorescent or phosphorescent material.

21 Claims, 8 Drawing Sheets

(56) References Cited

U.S. PATENT DOCUMENTS

| | | |
|---|---|---|
| 6,184,856 B1 | 2/2001 | Gordon, II |
| 6,225,971 B1 | 5/2001 | Gordon, II |
| 6,241,921 B1 | 6/2001 | Jacobson |
| 6,267,911 B1 | 7/2001 | Yen |
| 6,271,823 B1 | 8/2001 | Gordon, II |
| 6,278,417 B1 * | 8/2001 | Bock et al. .................. 345/4 |
| 6,301,038 B1 | 10/2001 | Fitzmaurice |
| 6,664,944 B1 | 12/2003 | Albert |
| 6,672,921 B1 | 1/2004 | Liang |
| 6,788,449 B2 | 9/2004 | Liang |
| 6,864,875 B2 | 3/2005 | Drzaic |
| 6,866,760 B2 | 3/2005 | Paolini Jr. |
| 6,870,657 B1 | 3/2005 | Fitzmaurice |
| 6,922,276 B2 | 7/2005 | Zhang |
| 6,950,220 B2 | 9/2005 | Abramson |
| 6,982,178 B2 | 1/2006 | LeCain |
| 7,002,728 B2 | 2/2006 | Pullen |
| 7,012,600 B2 | 3/2006 | Zehner |
| 7,075,502 B1 | 7/2006 | Drzaic |
| 7,116,318 B2 | 10/2006 | Amundson |
| 7,167,155 B1 | 1/2007 | Albert |
| 7,170,670 B2 | 1/2007 | Webber |
| 7,236,291 B2 | 6/2007 | Kaga et al. |
| 7,259,744 B2 | 8/2007 | Arango |
| 7,312,784 B2 | 12/2007 | Baucom |
| 7,321,459 B2 | 1/2008 | Masuda |
| 7,339,715 B2 | 3/2008 | Webber |
| 7,378,790 B2 | 5/2008 | Aruga |
| 7,411,719 B2 | 8/2008 | Paolini, Jr. |
| 7,420,549 B2 | 9/2008 | Jacobson |
| 7,453,445 B2 | 11/2008 | Amundson |
| 7,535,624 B2 | 5/2009 | Amundson |
| 7,561,324 B2 * | 7/2009 | Duthaler ............... G02F 1/1334 359/245 |
| 7,639,320 B2 * | 12/2009 | Itou et al. ................... 349/95 |
| 7,667,684 B2 | 2/2010 | Jacobson |
| 7,679,814 B2 | 3/2010 | Paolini, Jr. |
| 7,791,789 B2 | 9/2010 | Albert |
| 7,839,564 B2 | 11/2010 | Whitesides |
| 7,910,175 B2 | 3/2011 | Webber et al. |
| 7,952,790 B2 | 5/2011 | Honeyman |
| 7,956,841 B2 | 6/2011 | Albert |
| 8,009,348 B2 | 8/2011 | Zehner |
| 8,040,594 B2 | 10/2011 | Paolini, Jr. |
| 8,054,526 B2 | 11/2011 | Bouchard |
| 8,098,418 B2 | 1/2012 | Paolini, Jr. |
| 8,207,511 B2 | 6/2012 | Bortz |
| 8,213,076 B2 | 7/2012 | Albert |
| 8,319,759 B2 | 11/2012 | Jacobson |
| 8,363,299 B2 | 1/2013 | Paolini, Jr. |
| 8,441,714 B2 | 5/2013 | Paolini, Jr. |
| 8,441,716 B2 | 5/2013 | Paolini, Jr. |
| 8,466,852 B2 | 6/2013 | Drzaic |
| 8,576,470 B2 | 11/2013 | Paolini, Jr. |
| 8,576,476 B2 | 11/2013 | Telfer |
| 8,593,721 B2 | 11/2013 | Albert |
| 8,681,419 B2 | 3/2014 | Onaka |
| 8,797,634 B2 | 8/2014 | Paolini, Jr. |
| 8,830,559 B2 | 9/2014 | Honeyman |
| 8,867,117 B2 | 10/2014 | Gibson |
| 8,873,129 B2 | 10/2014 | Paolini, Jr. |
| 8,902,153 B2 | 12/2014 | Bouchard |
| 9,001,292 B2 | 4/2015 | Chen |
| 9,170,467 B2 | 10/2015 | Whitesides |
| 2002/0167268 A1 * | 11/2002 | Aruga et al. ................... 313/500 |
| 2003/0001994 A1 * | 1/2003 | Iino ................... 349/113 |
| 2004/0155857 A1 * | 8/2004 | Duthaler ............ G02F 1/1334 345/107 |
| 2007/0058115 A1 * | 3/2007 | Utsumi et al. ............... 349/109 |
| 2007/0070267 A1 * | 3/2007 | Yang ..................... 349/106 |
| 2007/0146509 A1 * | 6/2007 | Hekstra et al. ............... 348/253 |
| 2008/0043318 A1 | 2/2008 | Whitesides |
| 2008/0048970 A1 | 2/2008 | Drzaic |
| 2009/0004442 A1 | 1/2009 | Danner |
| 2009/0009699 A1 * | 1/2009 | Wu ............... B29D 11/00634 349/106 |
| 2009/0115952 A1 * | 5/2009 | Nakamura et al. ........... 349/143 |
| 2009/0225398 A1 | 9/2009 | Duthaler |
| 2010/0103502 A1 | 4/2010 | Jacobson |
| 2010/0136868 A1 * | 6/2010 | Chien et al. ................. 445/24 |
| 2010/0156780 A1 | 6/2010 | Jacobson |
| 2011/0261294 A1 * | 10/2011 | Jang et al. .................... 349/86 |
| 2011/0310459 A1 * | 12/2011 | Gates ................ G06F 3/0412 359/296 |
| 2012/0033164 A1 * | 2/2012 | Chen et al. ................... 349/108 |
| 2012/0293858 A1 | 11/2012 | Telfer, Jr. |
| 2012/0326957 A1 | 12/2012 | Drzaic |
| 2013/0128195 A1 * | 5/2013 | Chen et al. .................. 349/106 |
| 2014/0036208 A1 * | 2/2014 | Park et al. ................... 349/106 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.

Bach, U., et al., "Nanomaterials-Based Electrochromics for Paper-Quality Displays", Adv. Mater, 14(11), 845 (2002) Jun. 5, 2002.

Emmel, P. and Hersch, R.D., Spectral colour prediction model for a transparent fluorescent ink on paper, in Proc. IS&T/SID 6th Color Imaging Conference, Nov. 17-20, 1998, Scottsdale, 116-122 Nov. 20, 1998.

Kitamura, T., et al., "Electrical toner movement for electronic paper-like display", Asia Display/IDW '01, p. 1517, Paper HCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

Hayes, R.A., et al., "Video-Speed Electronic Paper Based on Electrowetting", Nature, vol. 425, Sep. 25, pp. 383-385 (2003) Sep. 25, 2003.

* cited by examiner

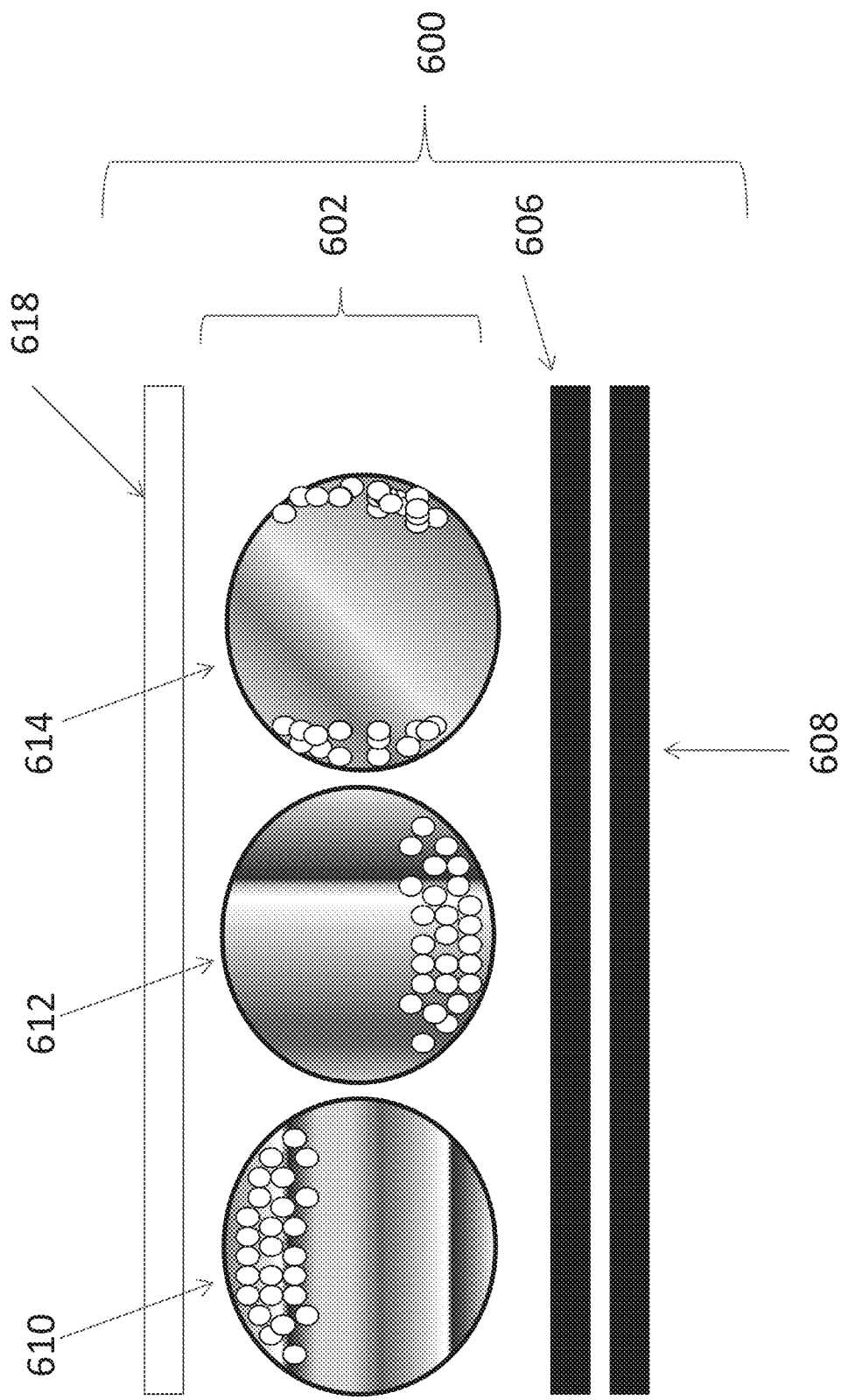

COLOR ELECTRO-OPTIC DISPLAYS

REFERENCE TO RELATED APPLICATIONS

This application claims benefit of Provisional Application Ser. No. 61/761,333, filed Feb. 6, 2013, and of Provisional Application Ser. No. 61/761,879, filed Feb. 7, 2013.

The entire contents of these copending applications and of all other U.S. patents and published and copending applications mentioned below, are herein incorporated by reference.

BACKGROUND OF INVENTION

This invention relates to electro-optic displays and materials for use in such displays. More specifically, in one aspect, this invention relates to color electro-optic displays utilizing rear color filters, and in another aspect, this invention relates to electro-optic displays in which fluorescent or phosphorescent materials are used to enhance the amount of light reflected from the display in certain states of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0257269; and 2012/0326957;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

The position of the color filter array (CFA) relative to the electro-optic medium in the optical stack can vary widely, but must take into account the type of electro-optic medium used and, in some cases, the properties of other layers of the optical stack. Color displays using CFA's can be broadly divided into two classes, namely front CFA displays (in which the CFA lies between the electro-optic medium and the viewing surface through which an observer views the display) and rear CFA displays (in which the CFA lies on the opposed side of the electro-optic medium from the viewing surface). If the electro-optic medium used is transmissive (i.e., light, typically from a backlight, passes through the electro-optic medium, which acts as a light valve controlling the amount of light which passes through each pixel, and then emerges from the viewing surface), the CFA can occupy any position in the optical stack, since regardless of the position of the CFA, light will pass through both the CFA and the electro-optic medium. Thus, both front and rear CFAs can be used with transmissive electro-optic media, although the former are probably more common.

When the electro-optic medium used is reflective, as are most electrophoretic media, it is normally necessary to use a front CFA; since light enters the viewing surface, is reflected from the electrophoretic medium and leaves via the viewing surface, the light would never reach a rear CFA. FIG. 1 of the accompanying drawings is a schematic section through a prior art front color filter array electrophoretic display (generally designated 100) of this type. The display 100 comprises a backplane 102 bearing a plurality of pixel electrodes 104. To this backplane 102 has been laminated an inverted front plane laminate as described in the aforementioned U.S. Pat. No. 7,839,564, this inverted front plane laminate comprising a monochrome electrophoretic medium layer 108 having black and white extreme optical states, and a rear adhesive layer 108. The inverted front plan laminate also includes a front adhesive layer 110 which is colored with red, green and blue areas aligned with the pixel electrodes 104 to form a front color filter array, a substantially transparent front electrode 112 (typically formed from indium-tin-oxide, ITO) and a front substrate 114. The color filter array layer 110 in FIG. 1 is positioned between the electrodes (i.e., between the front electrode 112 and the pixel electrodes 104). Sub-pixels of a CFA must be independently controllable, and so they must each have an associated sub-pixel electrode.

Front CFA displays suffer from the disadvantage that color filter arrays inherently absorb light, and the overall effect of the absorption of light by a front CFA is a darkening of the white state of the display. For example consider a front CFA display in which the color filter comprises regions of equal area that pass red, green, blue and white light, respectively (a RGBW display). The result is an absorption by the CFA of, in principle, 50% of light that could have been reflected from the display in the white state. Moreover if, for example, a particular primary color is intended to be displayed at maximum saturation, it is necessary for the display be switched to absorb light in all regions except those behind the particular CFA element corresponding to the desired color, so that only 25% of the total area of the display is available for display of a particular primary color. This results in a gamut of rather dark colors.

It is, however, possible to use a rear CFA with a shutter mode electro-optic medium which has one or more substantially transparent states and at least one light-transmissive state; see for example the aforementioned U.S. Pat. No. 7,259,744, which describes an electrophoretic medium having white and black opaque states, and a light-transmissive state which exposes a colored reflector positioned behind the electrophoretic medium. In the clear state the viewer can see through the electrophoretic layer to a reflective rear color filter array, which may, for example, have equal areas of red, green and blue; note that there is no need for a white area in the rear CFA since the white state can be produced at any sub-pixel by using the white state of the electrophoretic layer. One advantage of such a "three state" electrophoretic display with a reflective, rear CFA is that there is no requirement for light to pass through the CFA when the display is in its white state, thus leading to a substantial improvement in the white state. Moreover, brighter colors are available than are possible with a front CFA by mixing the white (uncolored, bright) state with colored states. There still remains the problem, however, that only one-third of the area of the display is available for reflection of each primary color; this is still superior to the 25% area available from the front CFA RGBW display as described above.

The present inventors have found that the colors available from a rear CFA electro-optic display in which the electro-optic medium is capable of two opaque states and a light-transmissive state can be improved by incorporating fluorescent or phosphorescent materials into the rear color filter array. Similar advantages can be obtained by using fluorescent or phosphorescent materials in an electrophoretic display having a single type of particle in a colored fluid (the color of the fluid varying between sub-pixels) and a black layer behind the electrophoretic layer.

In a rear CFA electro-optic display, the CFA may be disposed between the electro-optic layer and the rear electrodes, or may be disposed on the opposed side of the rear electrodes from the electro-optic layer, but the former location is generally preferred because it reduces the distance between the electro-optic layer and the CFA (thus reducing parallax between the two layers and possible color distortions caused by light leaving the display at a substantial angle to the normal), and because it simplifies display construction; since production of color requires reflection of light from either the CFA or a layer disposed behind the CFA, it is convenient to use a light-transmissive CFA and rely upon reflective rear electrodes to effect the necessary light reflection, rather than having to provide light-transmissive rear electrodes to enable light to reach a CFA disposed behind the rear electrodes, and then either make the CFA itself reflective or provide a separate reflector behind the CFA.

Positioning the CFA between the electro-optic layer and the rear electrodes does, however, place the CFA between the electrodes of the display, which means that the electrical properties of the CFA become important. Electrical properties are not typically a major consideration in commercial CFA materials, and difficulty may well be experienced in finding a material with the right combination of color and electrical properties. Furthermore, the CFA material must also satisfy the conventional requirements of high stability (e.g., resistance to degradation from UV light) and resistance to electrochemical reactions which may occur at the electrodes. It may be difficult, economically infeasible or impossible to find any available materials which meet both the electrical and conventional requirements simultaneously. Accordingly, there is a need for improved rear CFA electro-optic displays which ease the requirements on the CFA materials, and the present invention seeks to provide such displays, color filter arrays for use therein, and methods for the production thereof.

SUMMARY OF INVENTION

It has now been found that the proper operation of rear CFA displays is greatly influenced by the electrical properties of the colored materials used in the CFA (e.g., dyes such as colored photoresists). If the electrical resistivity (sometimes also referred to as the specific electrical resistance, which is different from the electrical resistance of a structure) of the colored material is too high, electrical communication between the electrodes might be impeded to the extent that the display will not switch correctly, reducing the quality of the display or even rendering it inoperable.

Accordingly, in one aspect of this invention, a rear color filter array display is provided in which the electrical properties of the materials between the front and rear electrodes are controlled to ensure proper operation of the display. Such a rear CFA display comprises a front electrode, at least one rear electrode, an electro-optic medium disposed between the top and bottom electrodes, and a colored material disposed between the top and bottom electrodes, wherein the colored material is present in a layer (hereinafter referred to simply as the "colored layer", and typically a dielectric layer) having a resistivity of less than about $10^{12}$ ohm cm, and preferably less than about $10^{10}$ ohm cm, at room temperature.

It has also been found that, when color-imparting materials with very low resistivities (less than about $10^6$ ohm cm) are used, the colored layer can be used as an electrode, thereby simplifying the construction of the display. Accordingly, this invention provides a CFA display comprising a front electrode, at least one rear electrode comprising a colored layer, and an electro-optic medium disposed between the front and rear electrodes. This construction eliminates the need to fabricate a pixel electrode conductor layer discrete from the colored layer, thus simplifying the stack.

In addition, it has been found that, in some cases, improved operation of the electro-optic display can be achieved when the colored material is patterned so that a portion of the area of the pixel electrodes is not covered by the colored material. It has also been found that suitable color can be produced despite spatial discontinuities in the colored material. Accordingly, this invention further provides a rear CFA display comprising a front electrode, at least one rear electrode, an electro-optic medium disposed between the front and rear electrodes, and a colored material disposed between the top and bottom electrodes, wherein at least a portion of at least one rear electrode is not covered by the colored material.

It has also been discovered that, in some cases, improved display characteristics can be achieved by using a plurality of differing colored materials in the same sub-pixel of a CFA. For example, a specific colored material may have electrical properties that allow for proper operation of the display but the color of that specific material might be unacceptable for production of a desired color gamut. This issue can be addressed by including first and second color-imparting materials having first and second colors, respectively spatially distributed within the same sub-pixel to give the appearance of a third, hybrid color. The hybrid color can appear, for example, as a blend of the first and second colors.

Accordingly, this invention provides a rear CFA display comprising a front electrode, a plurality of rear electrodes each defining a sub-pixel of the display, an electro-optic medium disposed between the front and rear electrodes; wherein for at least one sub-pixel a first colored material covers a first portion of the sub-pixel and a second color-imparting material covers a second portion of the sub-pixel.

The displays of the present invention can make use of any electro-optic medium having at least one transmissive state which allows light entering the display through a viewing surface to pass through the electro-optic medium, be reflected from the color filter (or pass through the color filter and be reflected from a layer behind the color filter, which is functionally the same thing), pass back through the electro-optic layer and emerge from the viewing surface. Thus, the electro-optic display of the present invention may make use of any of the types of electro-optic medium discussed above. The electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined with a plurality of capsules or microcells. Alternatively, the electrically charged particles and the fluid may be present as a plurality of discrete droplets surrounded by a continuous phase comprising a polymeric material. The fluid may be liquid or gaseous. Some embodiments of the present invention may have color filter arrays which do not lie between the electrodes of the display.

In another aspect, this invention provides a color electro-optic display having a viewing surface, and a layer of electro-optic material having a first and second substantially opaque optical states, the first and second substantially opaque optical states differing in color, the layer of electro-optic material also having a light-transmissive state. The color electro-optic display also comprises at least one electrode arranged to apply an electric field to the layer of electro-optic material so as to drive the electro-optic material to its first and second substantially opaque optical states, and to its light-transmissive state, and a [rear] color filter array display disposed on the opposed side of the layer of electro-optic material from the viewing surface, the color filter array having sub-pixels of at least two differing colors. In the color electro-optic display of the present invention, the sub-pixels of at least one color in the color filter array comprise a fluorescent or phosphorescent material capable of emitting light of substantially the same color as that of the sub-pixel in which the fluorescent or phosphorescent material is incorporated. Such a display may hereinafter be referred to as a "rear fluorescent color filter array" or "RFCFA" display of the present invention.

In another aspect, this invention provides an electrophoretic display having a viewing surface, a layer of electrophoretic material, and a light-absorbing layer disposed on the opposed side of the layer of electrophoretic material from the viewing surface. The layer of electrophoretic material comprises light reflecting particles disposed in a colored fluid, the layer of electrophoretic material having at least first and second pixels wherein the colored fluids differ in color. (For purposes of this invention, the light scattering of white particles will work equally well as truly light reflective particles, and in fact in a preferred embodiment, the particles are substantially white.) The electrophoretic display also comprises at least two electrodes each arranged to apply an electric field to one sub-pixel of the layer of electro-optic material so as to drive the layer of electrophoretic material to three optical states, namely (a) a first optical state in which the white particles lie adjacent the viewing surface so that the sub-pixel displays a white optical state at the viewing surface; (b) a second optical state in which the white particles are spaced from the viewing surface and the color of the fluid is displayed at the viewing surface; and (c) a third optical state in which the white particles occupy only a minor proportion of the area of the sub-pixel, so that the light absorbing layer is visible through the layer of electrophoretic medium so that a dark color is displayed at the viewing surface. At least one sub-pixel of the display has a fluorescent or phosphorescent material incorporated in the fluid of the layer of electrophoretic material. Such a display may hereinafter be referred to as a "fluorescent fluid electrophoretic" or "FFE" display of the present invention.

The RFCFA displays of the present invention can make use of any electro-optic medium having at least two opaque states and a light-transmissive state. Thus, the RFCFA electro-optic display of the present invention may make use of any of the types of electro-optic medium discussed above. The electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. In the case of both RFCFA and FFE displays of the present invention, the electrically charged particles and the fluid may be confined with a plurality of capsules or microcells. Alternatively, the electrically charged particles and the fluid may be present as a plurality of discrete droplets surrounded by a continuous phase comprising a polymeric material. The fluid may be liquid or gaseous. Some RFCFA displays of the present invention may have color filter arrays which do not lie between the electrodes of the display.

The displays of the present invention can be used in any application in which electro-optic displays have previously been used, for example as part of an electronic book reader, portable computer, tablet computer, cellular telephone, smart card, sign, watch, shelf label, or flash drive.

BRIEF DESCRIPTION OF DRAWINGS

As already mentioned, FIG. 1 of the accompanying drawings is a schematic cross-section through a prior art front color filter array electro-optic display.

FIG. 6 is a schematic cross-section through a fluorescent fluid electrophoretic display of the present invention

DETAILED DESCRIPTION

Figure 1:
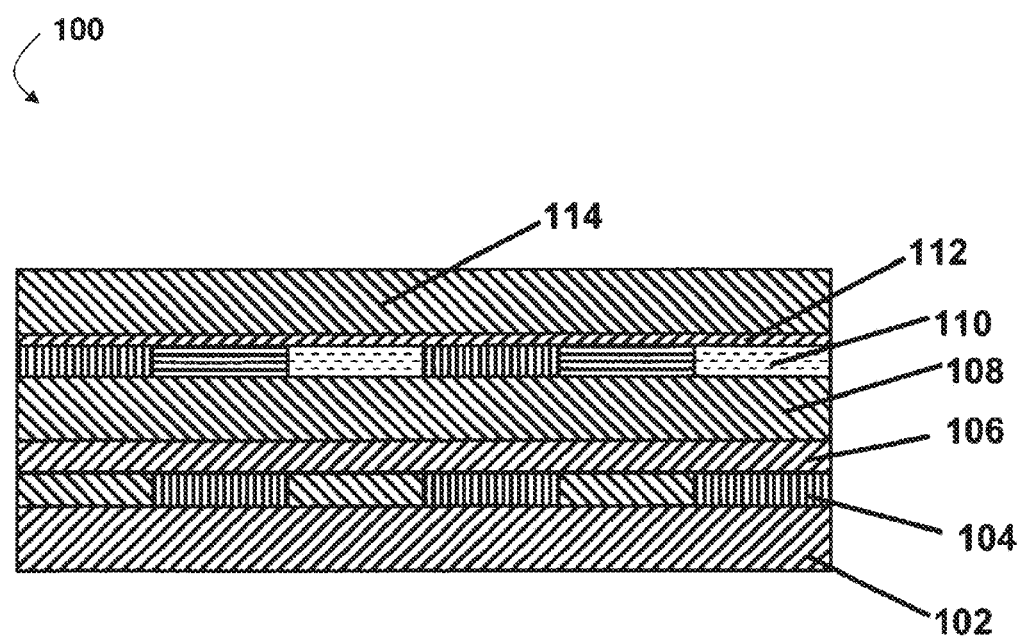

As previously mentioned, this invention provides rear CFA displays in which the colored materials have electrical properties that allow for proper operation of the display. Also this invention provides displays comprising sub-pixels in which the colored materials are spatially distributed such that proper electrical operation is maintained while producing suitable color.

The term "colored material is used herein to mean a material present within a sub-pixel in order to provide a color used to produce a color image. Exemplary colored materials include, but are not limited to, dyes, colored photoresists, and the like.

In one aspect, a color filter array comprising layers of material with controlled electrical properties and/or thicknesses is provided. In some embodiments, the color filter array display comprises a colored material with a relatively low electrical resistivity. The use of colored materials with relatively low electrical resistivities allows for electrical current to pass through the colored material without being significantly impeded, thereby allowing the electrodes within the display to effectively control the electro-optic medium. In some embodiments, the electrical resistivity of the colored material within the color filter array display is less than about $10^{12}$ ohm-cm, desirably less than about $10^{10}$ ohm-cm, preferably less than about $10^8$ ohm-cm, and most desirably less than about $10^6$ ohm-cm at room temperature. In some embodiments, the electrical resistivity of every material positioned between the display electrodes within the color filter array display less than about $10^{12}$ ohm-cm, desirably less than about $10^{10}$ ohm-cm, preferably less than about $10^8$ ohm-cm, and most desirably less than about $10^6$ ohm-cm. at room temperature (about 20° C.).

The colored material can be relatively thin compared to the electrophoretic medium layer, resulting in a relatively small electrical resistance through the colored material. The use of a relatively thin color-imparting material layer (in comparison to the electro-optic medium layer) can allow for effective electrical control of the electro-optic medium, even when colored materials with relatively high electrical resistivities are used. In some embodiments, the thickness of the color-imparting material layer can be less than about 0.25, less than about 0.1, or less than about 0.01 times the thickness of the electro-optic medium layer. Further, in some embodiments, the electrical resistance of the colored material layer, as measured through its thickness, is less than about 1, less than about 0.5, less than about 0.1, or less than about 0.05 times the electrical resistance of the electro-optic medium layer, as measured through its thickness at room temperature. As used herein, the electrical resistance, R, of a structure measured in a particular direction is defined by the Equation:

$$R = \rho \frac{l}{A} \qquad [1]$$

wherein l is the length of the dimension of the article through which current is to be passed (e.g., the thicknesses of the electro-optic medium and colored material layers in the examples above), A is the cross sectional area of the article measured perpendicular to length l, and ρ is the electrical resistivity of the material from which the article is made (also sometimes referred to the specific electrical resistance).

Figure 2:
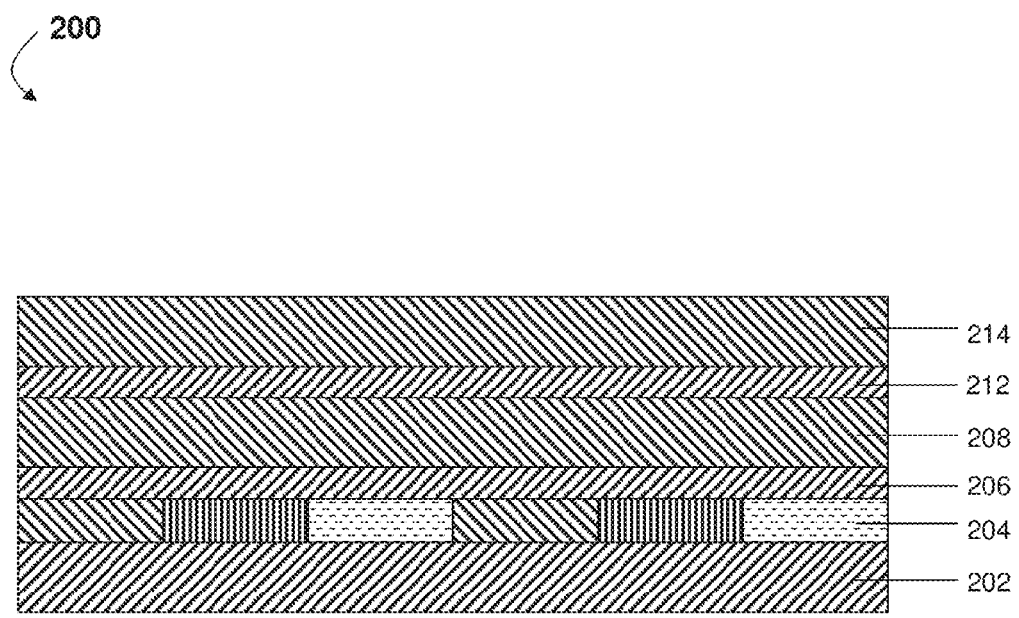
FIG. 2 is a schematic cross-section through a rear color filter array electro-optic display of the present invention

In some embodiments, colored materials with low electrical resistivities can be used as electrodes within the electro-optic display. Using such colored materials can, in some embodiments, eliminate the need to include an additional pixel electrode conductor layer in the display stack, which can simplify the fabrication of the display. FIG. 2 of the accompanying drawings is a schematic cross-section through a rear CFA display (generally designated 200) comprising a plurality of sub-pixel electrodes 204 comprising colored materials. The sub-pixel electrodes 204 can comprise any suitable colored material combinations. For example, in some embodiments, the sub-pixel electrodes can be constructed and arranged to display three different colors (e.g., red, green, and blue; cyan, magenta, and yellow; or any other suitable combination). In some embodiments, the sub-pixel electrodes can be constructed and arranged to include a white region (e.g., red, green, blue, and white; cyan, magenta, yellow, and white; or any other suitable combination). In some cases, the sub-pixels can be constructed and arranged to display four, five, six, or more colors.

The rear CFA display 200 shown in FIG. 2 comprises a backplane 202 over which the sub-pixel electrodes 204 are positioned. Display 200 also includes a transparent conductive layer 212, which serves as the front electrode of the display, and an electro-optic (preferably electrophoretic) medium layer 206 positioned between sub-pixel electrodes 204 and transparent conductive layer 212. The electro-optic medium layer 206 can have, for example, an extreme black optical state (in which color from the sub-pixels is hidden) and a transparent optical state (in which color from the sub-pixels can be seen through the electro-optic medium). Optionally, the display can also comprise adhesive layer 208 and/or front protective layer 214.

As mentioned above, it can be difficult in some cases to ensure proper operation of an electro-optic display when the entire area of the sub-pixel is covered by a colored material. For example, the electrical resistivity of the colored material might be too high to allow for proper operation of the display. In some cases, it might be difficult to create, produce, or obtain a color-imparting material that exhibits suitable spectral properties and durability after exposure to sunlight and/or the electrochemistry of the display while exhibiting an electrical resistance suitable for operation of the display. Alternatively, a colored material possessing all of these desired properties might be prohibitively expensive for a given application. Accordingly, in some embodiments, at least a portion of the sub-pixel area can be free of colored material.

The portion of the sub-pixel free from the colored material can allow a relatively large amount of current to pass through it, compensating for the region(s) of the sub-pixel covered by colored material that allow relatively small amounts of current to pass. Such an arrangement can allow for proper operation of the display. In some embodiments, at least about 5%, at least about 10%, at least about 25% and/or less than about 50% of the area of the sub-pixel is not covered by colored material.

Figure 3A:
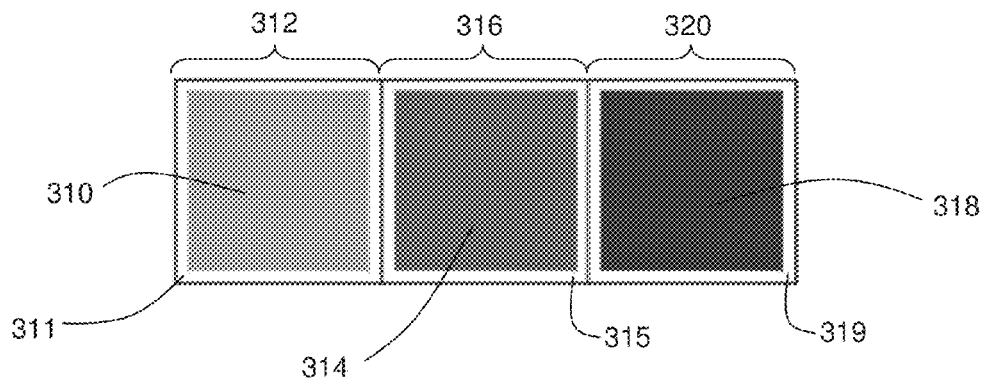
FIGS. 3A-3G are schematic top plan views illustrating various possible spatial distributions (patterns) of colored materials within sub-pixels.

The colored material can be arranged in a variety of patterns to achieve the desired electrical conductivity across the sub-pixel. FIGS. 3A-3F are schematic top plan views of several embodiments in which a colored material covers only a portion of the sub-pixel. In FIG. 3A, a first (e.g., green) colored material covers portion 310 of sub-pixel 312, a second (e.g., red) colored material covers portion 314 of sub-pixel 316, and a third (e.g., blue) colored material covers portion 318 of sub-pixel 320. In addition, portion 311 of sub-pixel 312, portion 315 of sub-pixel 316, and portion 319 of sub-pixel 320 are not covered by colored material. In some embodiments, a relatively large amount of electrical current can be passed through regions 311, 315, and 319 of the sub-pixels, relative to the amount of electrical current passed through regions 310, 316, and 318, respectively.

In FIG. 3A, the colored materials are in the shape of a square, but it should be understood that other suitable shapes can also be used, in addition to or in place of squares. For example, in FIG. 3B, the color-imparting material is in the shape of a circle. Other suitable shapes include ellipses; triangles; shapes with 5, 6, 7, 8, or more sides; and the like. Any of the shapes outlined above can be used alone or in combination with other shapes.

In addition, while FIG. 3A illustrates the use of red, green, and blue colored materials, it should be understood that any suitable colors in place of or in addition to red, green, and blue can be employed.

Figure 3B:
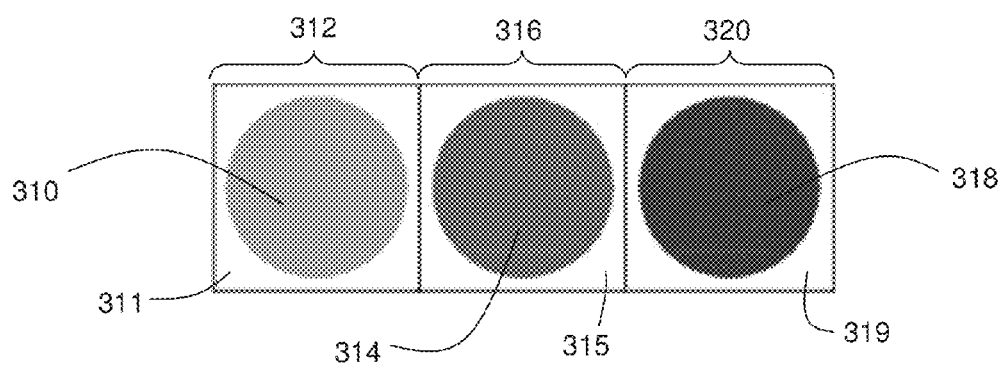
Figure 3C:
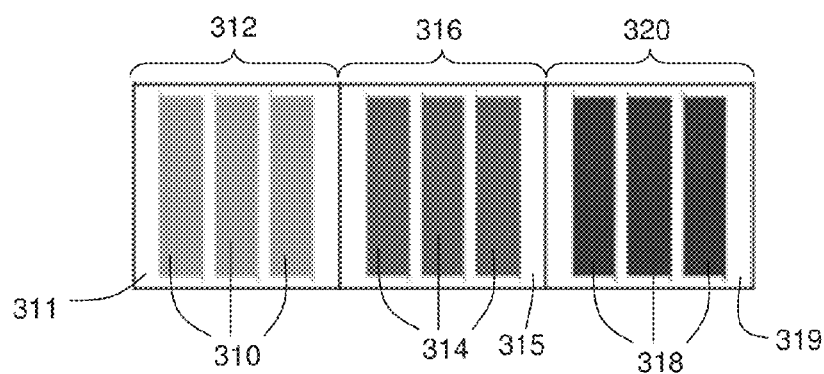
Figure 3D:
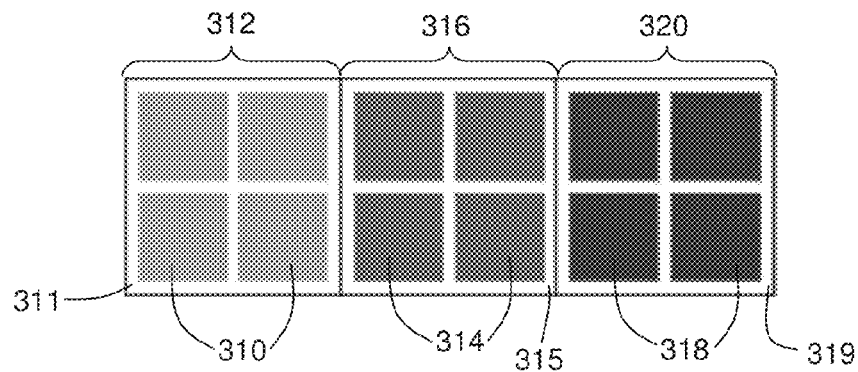
Figure 3E:
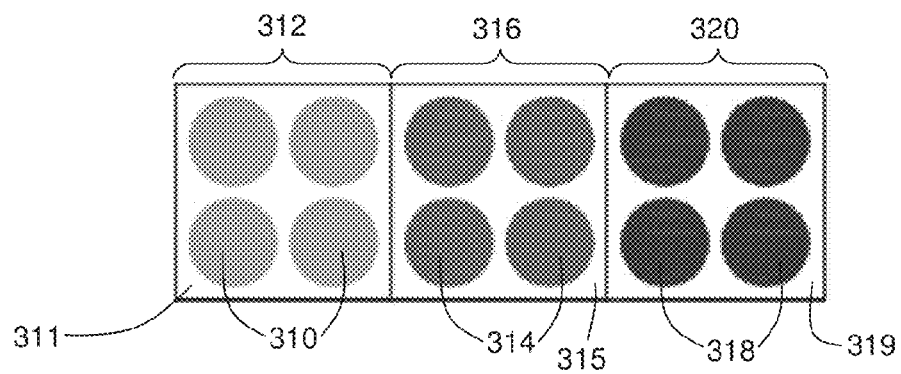
Figure 3F:
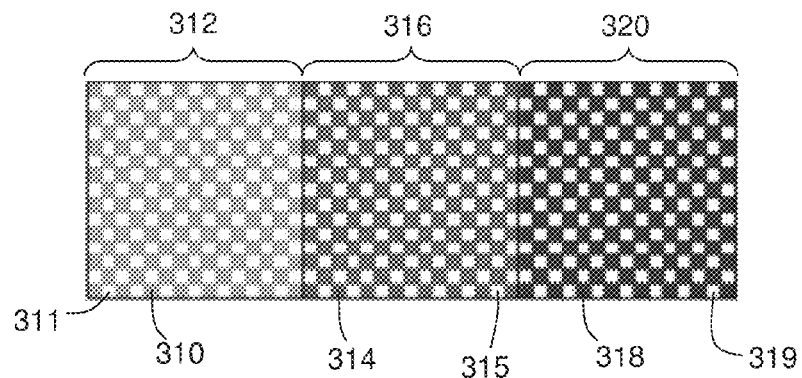

In FIGS. 3A-3B, the colored material is disposed within a single continuous region within each sub-pixel. However, in other embodiments, a sub-pixel can comprise multiple, discontinuous regions of colored material. For example, in FIG. 3C, the colored material in each sub-pixel is formed as a series of three discontinuous rectangles. The colored material can be formed in any number of discontinuous regions within the sub-pixel. For example, in FIG. 3D, colored materials are formed as four discontinuous squares, arranged in a 2×2 array. In FIG. 3E, the colored materials are formed as four discontinuous circles, arranged in a 2×2 array. The sub-pixels and displays of the present invention are of course not limited to 2×2 arrays, and arrays comprising any suitable number of rows and columns could be used. In some embodiments (such as when the production process used to pattern the colored material within the sub-pixels is too expensive or unable to produce a large number of discontinuous regions of colored material), a relatively small number of discontinuous regions of colored material can be used. In other cases, a relatively large number of discontinuous regions of colored material can be used.

In some cases, the sub-pixel can include multiple, discrete discontinuous portions that are not covered by colored material. For example, in FIG. 3F, a checker-board pattern (comprising regions covered by the colored material and regions not covered by the colored material) is formed in each sub-pixel. Also, for any of the embodiments illustrated in FIGS. 3A-3E, the colored and uncolored regions can be reversed such that the colored material occupies regions 311, 315, and 319, and no colored material is present in regions 310, 314, and 318.

Figure 3G:
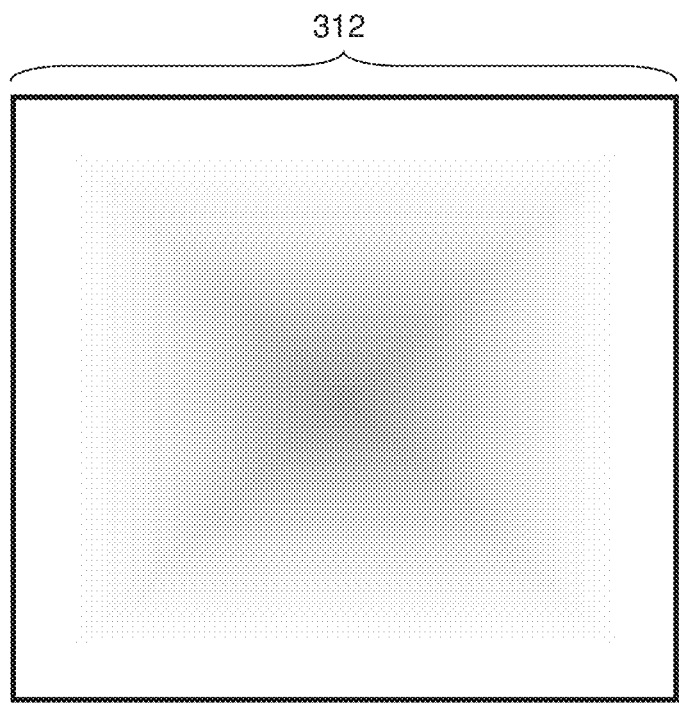

In some embodiments, the color intensity can vary across a lateral dimension of the sub-pixel such that one area of the sub-pixel is densely colored and another portion of the sub-pixel is substantially colorless, with other regions containing intermediate color intensities. For example, FIG. 3G illustrates a sub-pixel 312 in which the center is relatively densely colored, and the color density gradually diminishes from the center to the periphery, which is substantially colorless. Such a variation in color density can be achieved using a variety of methods. For example, such a pattern could be developed by using a colored material which develops (or loses) its color upon exposure to radiation, and selectively scanning the sub-pixel using a radiation source. A similar effect can be achieved by patterning the colored material to form spatially dense dots (or other suitable shapes) toward the middle region of the sub-pixel and spatially sparse dots near the edges of the sub-pixel.

The exemplary patterns depicted in FIGS. 3A-3G can have various advantages, depending upon the application in which the display is to be used. For example, the patterns illustrated in FIGS. 3A-3B would generally require relatively low printing and/or patterning resolution, whereas the patterns in FIGS. 3C-3F allow exposure of the underlying pixel electrode in more places for an equivalent area of exposed pixel electrode, which would provide a more uniform color appearance upon switching.

In any of the embodiments described herein, the region that is free of colored material within the colored material layer can also be free of electrically conductive material such as a metal. For example, in some cases, the region that is free of colored material can be occupied by a liquid similar to that used within the electro-optic medium, or another material.

In some embodiments, one or more regions substantially free of colored material can be at least partially filled with electrically conductive material such as a metal. The electrically conductive material can be constructed and arranged, in some embodiments, such that it electrically connects the pixel electrodes to the electro-optic medium, thereby ensuring that the electro-optic medium is capable of switching states upon application of a suitable current.

The use of sub-pixels comprising areas substantially free of colored material (and, optionally, substantially free of electrically conductive material) can provide a number of advantages. For example, the use of sub-pixels comprising regions within the colored layer that are substantially free of colored material can eliminate the need for separate fabrication steps related to producing one or more electrically conductive vias through the colored layer connecting with a conductive layer superposed on the colored layer, thus reducing the complexity and cost of fabricating the display. In addition, electrically conductive via materials and material used in the conductive layer (e.g., metals) can absorb light, leading to light loss within the display. Accordingly, elimination of the vias and the associated conductive layers can result in brighter display colors and generally enhanced display performance.

As mentioned elsewhere, it can be difficult in some instances to produce proper color from a single colored material while maintaining suitable electrical properties within a sub-pixel. Accordingly, in some cases, first and second colored materials (having first and second colors, respectively) can be spatially distributed within the sub-pixel to give the appearance of a third color. The third color can appear, for example, as a blend of the first and second colors.

Figure 4:
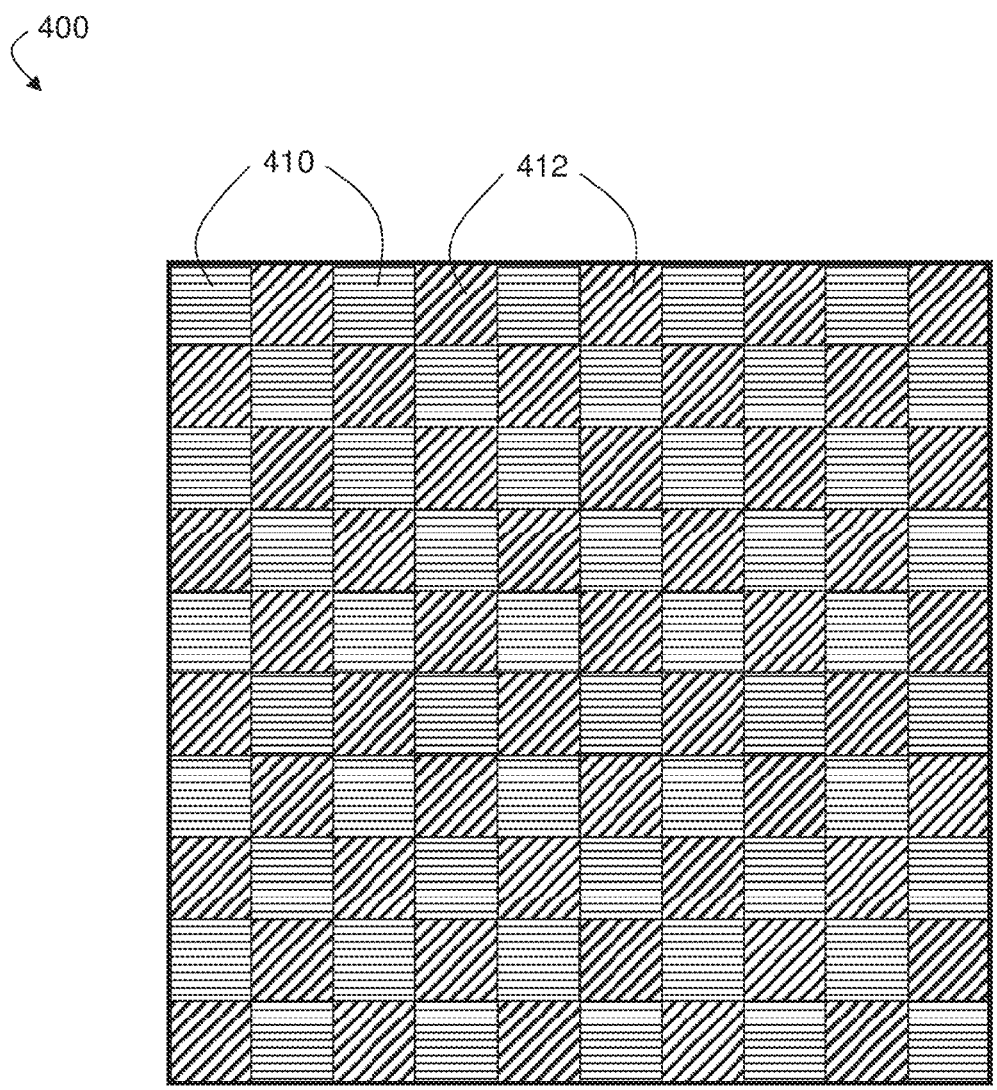
FIG. 4 is a schematic top plan view of a sub-pixel comprising multiple colored materials.

The first and second colored materials can be arranged in a variety of suitable patterns. For example, FIG. 4 illustrates a sub-pixel 400 including a first colored material disposed in regions 410 and a second colored material disposed in regions 412 to form a checkerboard pattern. The first and second colored materials can combine to produce a desirable hybrid color. As an illustrative example, regions 410 might include a red colored material while regions 412 might include a blue colored material, which might produce a hybrid purple color, for example, when viewed from a sufficient distance. In some embodiments, the hybrid color might be difficult and/or expensive to produce using a single colored material. As another example, in some embodiments, the second color-imparting material might occupy any of regions 311, 315, and/or 319 in the embodiments illustrated in FIGS. 3A-3F.

Aside from varying the colors of the multiple colored materials within a sub-pixel, the hybrid color can also be varied by changing the relative areas of the colored materials. For example, in the case where red and blue colored materials are used within a single-sub pixel, the shade of purple produced can be skewed toward blue by including a relatively large area of blue colored material within the sub-pixel, compared to the area of red colored material. Alternatively, the shade of purple produced can be skewed toward red by including a relatively large area of red colored material within the sub-pixel, compared to the area of blue colored material.

While the use of two colored materials to produce hybrid colors has been described above, it should be understood that, in some embodiments, three, four, five, or more colored materials can be included in a single sub-pixel to produce the desired hybrid color. In addition, in some embodiments, a single sub-pixel can include at least two colored material regions as well as at least one region that is free of colored material to produce a hybrid color.

One of ordinary skill in the art, given the disclosure herein, would be capable of producing a wide variety of hybrid colors by performing a screening test in which the colors of colored materials, and their relative exposed areas are varied (e.g., randomly or according to a designed experimental program). One of ordinary skill in the art would then measure the resulting color produced to determine whether the tested combination was successful.

The use of multiple colored materials to produce hybrid colors can provide a number of advantages. For example, in many cases, it is possible to produce new colors using existing colored materials. This is often desirable as, in many instances, it is difficult and/or time consuming to develop new colored materials. The use of multiple colored materials to create hybrid colors can be useful, for example, in creating colors other than the traditional red, green, and blue colors used in many displays. Exemplary hybrid colors that could be produced using multiple color-imparting materials include, but are not limited to orange, purple, lime, magenta, yellow, and/or any color for which an appropriate color spectrum is difficult to obtain using a single colored material. In some embodiments, multiple colored materials can be used to produce any of the colors described in U.S. Patent Application Publication No. 2012/0257269, which is incorporated herein by reference in its entirety for all purposes.

The patterns of colored materials within the sub-pixels described herein can be achieved using any suitable manufacturing process. For example, in some embodiments, photolithography (e.g., using a colored material comprising a photoresist) can be used to produce the desired distribution of colored material within the sub-pixel. Other exemplary processes that can be used to produce patterned colored materials include, but are not limited to, ink jet printing and thermal transfer printing.

While the embodiments described above have focused primarily on rear CFA displays, in which the color-imparting material is disposed between the front and rear electrodes of the display, the arrangements described above can also be used in displays in which the colored material lies outside the front and rear electrodes, i.e., behind the rear electrodes.

As previously mentioned, in one aspect this invention provides an RFCFA display having a viewing surface, and a layer of electro-optic material having a first and second substantially opaque optical states, the first and second substantially opaque optical states differing in color, the layer of electro-optic material also having a light-transmissive state. Typically, the opaque states will be black and white, and in a preferred form of the RFCFA display the electro-optic medium is an electrophoretic medium comprising white and black particles, normally bearing charges of opposite polarity, in an essentially colorless fluid. The color electro-optic display also comprises at least one electrode arranged to apply an electric field to the layer of electro-optic material so as to drive the electro-optic material to its first and second substantially opaque optical states, and to its light-transmissive state. Typically, an RFCFA display will have the conventional electrode arrangement used in commercial active matrix displays, with a single, common front electrode adjacent the viewing surface and a matrix of pixel electrodes on the opposed side of the electro-optic layer from the viewing surface. A rear color filter array display is disposed on the opposed side of the layer of electro-optic material from the viewing surface, the color filter array having sub-pixels of at least two differing colors. Typically, the CFA will comprise red, green and blue sub-pixels, although other color combinations can be used, for example yellow, cyan and magenta. There is of course no need for white pixels in the CFA since a white color in a sub-pixel can be displayed using the white opaque state of the electro-optic layer, and indeed white sub-pixels should be avoided since they reduce the area of the display available for displaying each color. The sub-pixels of at least one color in the color filter array comprise a fluorescent or phosphorescent material capable of emitting light of substantially the same color as that of the sub-pixel in which the fluorescent or phosphorescent material is incorporated. Thus, for example in a red/green/blue RFCFA display of the present invention, the red sub-pixels may incorporate a fluorescent or phosphorescent material capable of emitting red light, and the green sub-pixels may incorporate a fluorescent or phosphorescent material capable of emitting green light. It is not necessary that the light emitted from the fluorescent or phosphorescent material have exactly the same color as that of the sub-pixel in which it is incorporated, and indeed in many cases it will not be possible for the emitted light to have exactly the same spectral characteristics as the sub-pixel itself.

Figure 5:
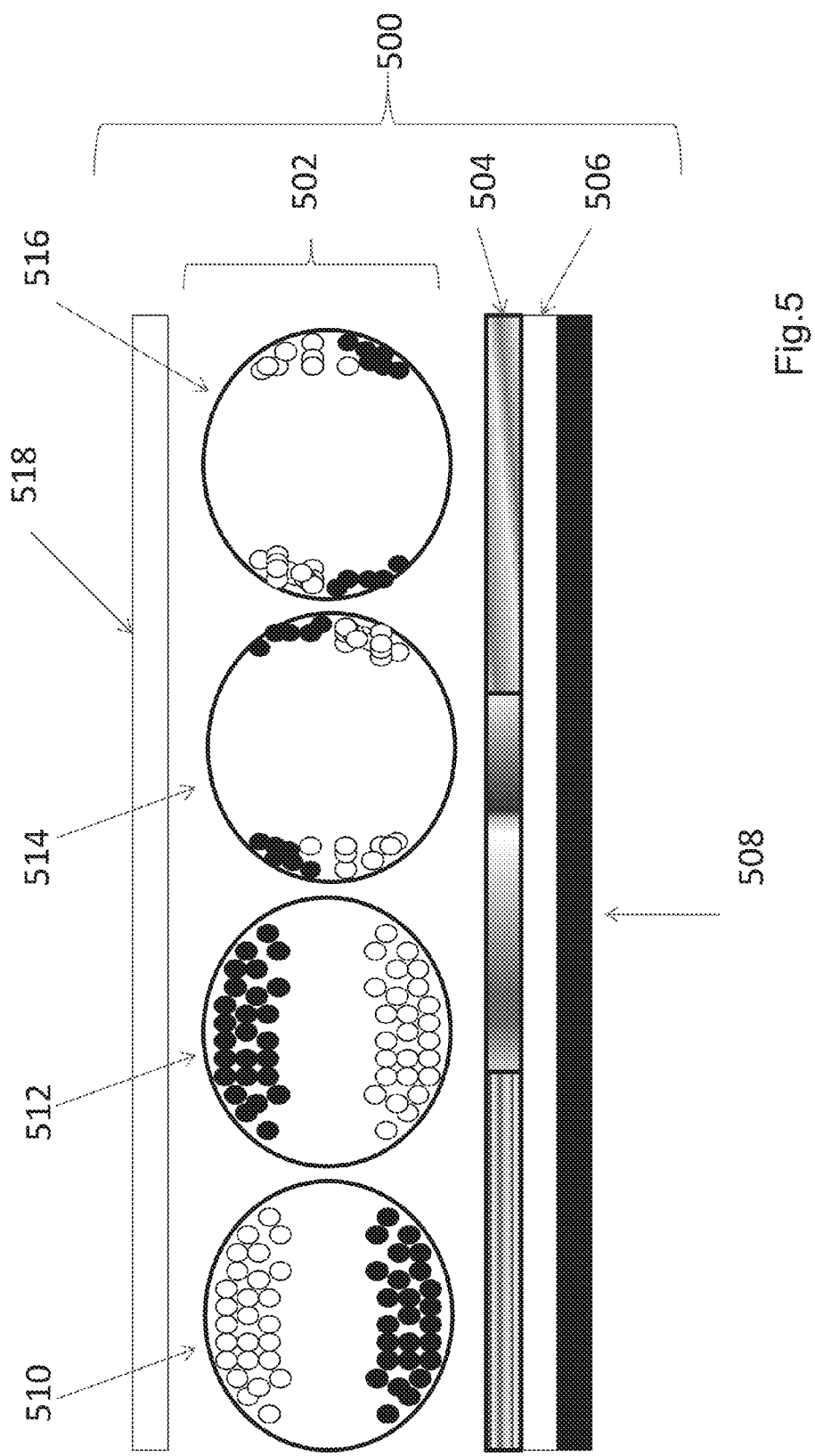
FIG. 5 of the accompanying drawings is a schematic cross-section through a rear fluorescent color filter array display of the present invention.

FIG. 5 is a schematic cross-section through a rear fluorescent color filter array of the present invention, generally designated 500. The display 500 is an electrophoretic display having an electrophoretic layer (generally designated 502), which itself comprises particles of a white (opaque) and a black pigment disposed in a fluid, and enclosed within capsules 510, 512, 514, 516, although the presence of such capsules is not an essential feature of the invention; unencapsulated, polymer-dispersed, microcell and microchannel electrophoretic media and non-electrophoretic media may also be used. On one side of the electrophoretic layer 502 is disposed a transparent electrode 518, typically supported on a plastic or glass substrate (not shown); the upper surface of the electrode 518 (as illustrated) or the surface of the substrate remote from the electrophoretic layer 520 forms a viewing surface through which a user views the display 500. On the opposed side of the electrophoretic layer 520 from the electrode 518 are (in order from the electrophoretic layer 520) a color filter array 504, a reflective layer 506 and an electrode array 508 that may comprise a thin film transistor array or a segmented electrode assembly, both of which are well known in the art. The electrodes in the electrode array 508 are aligned with the elements of the color filter array 504, i.e., FIG. 5 shows reading left-to-right, red, green and blue color filter array elements, and three separate electrodes (not shown individually) are present in the electrode array 50 aligned with these red, green and blue color filter array elements.

The black and white pigments in capsules 510, 512, 514, 516, preferably bear charges of opposite polarity. Upon application of a DC electric field using electrode array 508 and electrode 518, the white and black pigment particles move in opposite directions, parallel to the electric field lines. Each capsule 510, 512, 514, 516, has three optical states, namely a white state, illustrated by capsule 510, in which the white particles lie adjacent the electrode 518 so that an observer viewing the display through the viewing surface sees a white color, a dark state, illustrated by capsule 512, in which the black particles lie adjacent the electrode 518 so that an observer viewing the display through the viewing surface sees a dark color, and a light-transmissive state, illustrated by capsules 514 and 516, in which the white and black particles occupy only a small proportion of the area of each capsule so that light can pass through the capsule and the CFA 504, be reflected from the reflector 506, and pass back through the CFA 504 and the capsule, so that an observer viewing the display through the viewing surface sees the color of the element of CFA through which the light has passed. The light-transmissive state (otherwise known as "shuttering") can be brought about by application of an AC field, the provision of lateral electrodes, for example in the electrode array 508, or patterned electrodes occupying a small fraction of the total area of the display in the plane of electrode 518.

(FIG. 5 is highly schematic and should not be taken literally. Firstly, in practice, capsules in electrophoretic displays are normally not spherical but essentially prismatic; see for example, U.S. Pat. No. 7,391,555. Secondly, there are typically far more capsules in each pixel that is represented in FIG. 5. Lastly, in practice, all capsules overlying a specific electrode in the electrode array 508 switch together, and where a capsule overlies two different electrodes, the two parts of the capsule can switch independently of one another so that, for example, a capsule can be part black and part white at the same time.)

In a front CFA display, light passes through the front CFA at all times, regardless of the state of the underlying electro-optic layer. Accordingly, it is highly inadvisable to incorporate either fluorescent or phosphorescent materials into a front CFA since the resultant fluorescence or phosphorescence would pollute image shown on the display by, for example, degrading the dark state. To produce acceptable images, a front CFA needs to average to a chromatically neutral, gray tone. However, there is no similar requirement for a rear CFA to average to a chromatically neutral, gray tone since, as already described, when a white or dark state is to be displayed, white or dark particles are disposed adjacent the viewing surface, and light entering through the viewing surface never reaches the CFA. An element of a rear CFA is only exposed when it is desired to display the color of that element. Hence, it is practicable, and indeed desirable, to incorporate fluorescent or phosphorescent materials into a rear CFA, in accordance with the present invention, and indeed it is desirable to do so in order to recover some of the light which would otherwise be absorbed in the CFA and convert it to light of the color of the relevant filter element, thereby increasing the amount of light of the desired color leaving the filter element. Accordingly, in FIG. 5, the red elements of rear CFA 504 incorporate a fluorescent material which fluoresces in the red, and the green elements of rear CFA 504 incorporate a fluorescent material which fluoresces in the green. (Although reference is made herein to incorporation of fluorescent or phosphorescent materials "into" the rear CFA, it will be appreciated that it is not necessary that these materials actually be physically present in the colored filter elements themselves; the fluorescent or phosphorescent materials could be disposed in a layer lying between the rear CFA and the electro-optic layer, and the same effect would be obtained.)

Fluorescence is the emission of electromagnetic radiation (e.g., visible light) of one wavelength by a material following absorption of radiation of another, shorter wavelength by that material. The difference in energy between absorbed and emitted photons (the so-called "Stokes shift") is the result of energy lost to vibration (i.e., heat). Therefore, in a rear CFA with red, green and blue-reflecting elements, a fluorophore (fluorescent material) incorporated into the red filter elements might absorb green and blue light and fluoresce in red (i.e., emit photons lower in energy than blue or green). A fluorophore incorporated into the green filter elements might absorb blue light and fluoresce in green. In this way, some of the light that would otherwise be absorbed in color filter elements is not lost altogether. The efficiency with which light energy can be recovered by fluorescence depends upon the energy difference between the absorbed and emitted photons, and upon the quantum yield of fluorescence. Materials with quantum yields greater than 50% are known in the art (see, for example, "Spectral Colour Prediction for a Transparent Fluorescent Ink on Paper", P. Emmel, R. D. Hersch, Proc. IS&T/SID, 1998, 116).

As noted above, fluorescence always involves a spectral shift to lower photon energy. In order for a material to fluoresce in blue light, absorption must occur at shorter wavelengths, i.e., in the near ultra-violet region of the electromagnetic spectrum. In some conditions of illumination (for example, incandescent lighting) there may be very little ultraviolet component of light falling upon a display, and consequently little fluorescence. However, as noted above, it is not a requirement of a rear CFA that the average absorption be balanced to a neutral, gray tone. Therefore, if fluorescence is incorporated into the red and green CFA elements but not into the blue, as described above, the area of blue filter elements may be increased in compensation. Thus, for example, for every one red or green fluorescent CFA element there may be provided two, non-fluorescent blue elements. In general, the pattern of colors of a rear CFA may be tailored for maximum color gamut without the requirement to maintain gray balance in the white state of the display.

Although in the rear CFA display 500 shown in FIG. 5, the CFA is disposed between the front and rear electrodes of the display, RFCFA displays of the present invention can also have the rear CFA lying outside the front and rear electrodes, i.e., behind the rear electrodes.

As previously mentioned, the present invention is not restricted to displays in which a fluorescent or phosphorescent material is incorporated into a rear CFA, but extends to fluorescent fluid electrophoretic displays, such as the display (generally designated 600) illustrated in FIG. 6. The display 600 comprises a front electrode 618 and a rear electrode assembly 608, both of which are essentially identical to the corresponding electrodes of display 500 shown in FIG. 5. However, the rear CFA 504 and reflector 506 of display 500 are replaced in display 600 by a single light-absorbing layer 606. Also, although display 600 comprises an electrophoretic layer 602, this layer differs significantly from layer 502 of display 500 in that electrophoretic capsules 610, 612, and 614, contain a single white pigment particle in a dyed fluid, the fluid being red in capsule 610, green in capsule 612 and blue in capsule 614. As with the capsules 510, 512, 514, and 516, shown in FIG. 5, the capsules 610, 612, and 614 shown in FIG. 6 each have three optical states, namely a white state, illustrated by capsule 610, in which the white particles lie adjacent the electrode 618 so that an observer viewing the display through the viewing surface sees a white color, a dark state, illustrated by capsule 614, in which the white particles occupy only a small proportion of the area of each capsule so that light can pass through the capsule and be absorbed by the rear, light-absorbing layer 606 so that an observer viewing the display through the viewing surface sees a dark color, and a colored state, illustrated by capsule 612, in which the white particles lie adjacent the light-absorbing layer 606 so that light entering the viewing surface passes through the colored fluid within the capsule, with absorption of the unwanted colors, is reflected from the white particles and passes back through the colored fluid to emerge from the viewing surface, so that an observer viewing the display through the viewing surface sees the color of the colored fluid within the capsule.

Fluorescent or phosphorescent materials may be incorporated into the colored fluids of such a display. Accordingly, in FIG. 6, the red capsules 610 incorporate a fluorescent material which fluoresces in the red, and the green capsules 612 incorporate a fluorescent material which fluoresces in the green. No fluorescent material is incorporated into the blue capsules 614 but again the area of the blue capsules may be increased relative to the red and green capsules to compensate for the lack of fluorescent material. It will be apparent to those skilled in the display art that the presence of the fluorescent material will have essentially no effect on the white states of the green and blue capsules, in which the colored fluid is masked by the white particles, and little effect on the dark states of the green and blue capsules, since a large proportion of any fluorescence will be absorbed by the light-absorbing layer 606, but will serve to enhance the brightness of the colored states of the green and blue capsules by converting light that would otherwise simply be absorbed in the colored fluid to light of the desired color.

Phosphorescent pigments might also be used in the displays of the present invention. In phosphorescence, the transition from an excited state to the ground state, with emission of a photon, is a quantum-mechanically forbidden process that typically occurs over much longer time scales than fluorescence. Phosphorescent materials with high luminescent persistence, up to 12-16 hours, have been reported. Photoluminescent phosphorescent materials with emissions in the visible region of the electromagnetic spectrum are known in the art. For example, metal sulfide pigments which contain various elemental activators, co-activators and compensators have been prepared which absorb in the near-UV and have emissions at blue wavelengths. As disclosed in U.S. Patent Application Publication No. 2009/0302237 "such phosphors generally comprise an alkaline earth aluminate host matrix and can be represented, for example, by $MAl_2O_3$ or $MAl_2O_4$ wherein M can comprise a plurality of metals, at least one of which is an alkaline earth metal, such as calcium, strontium, barium and magnesium. These materials generally deploy europium as an activator and can additionally also contain one or more rare earth materials as co-activators. Examples of such high intensity and high persistence phosphors can be found, for example, in U.S. Pat. No. 5,424,006, U.S. Pat. No. 5,885,483, U.S. Pat. No. 6,117,362 and U.S. Pat. No. 6,267,911 B1." Photoluminescent, phosphorescent materials may be combined with fluorescent materials to provide emission in any region of the visible spectrum.

In the displays of the present invention, a phosphorescent CFA could absorb light in the open shuttered state during periods of non-use. For reading in conditions of reduced lighting (for example, at night) the CFA elements would continue to emit low levels of light.

The present invention allows for improved white state and color gamut in color electro-optic displays as compared with similar displays using a front color filter array. The enhancements provided by the present invention resemble those provided by backlighting a shutter mode display without requiring the power consumption inevitable in backlighting.

All patents and patent publications mentioned herein are incorporated herein by reference in their entirety for all purposes. In cases of conflict, the present specification shall control.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A color electro-optic display comprising a front electrode, at least one rear electrode, an electro-optic medium disposed between the front and rear electrodes, the color display comprising at least one color pixel comprising a plurality of independently addressable sub-pixels, the display further comprising a color filter array having sub-pixel areas aligned with the sub-pixels of the display, wherein at least one sub-pixel area comprises first and second areas with substantially different optical properties, and wherein the resistivity of the color filter array is less than about $10^{12}$ ohm cm at room temperature.

2. A color display according to claim 1 wherein the first area is covered by a colored material, and the second area is not covered by a colored material.

3. A color display according to claim 1 wherein the first area is covered by a first colored material, and the second area is covered by a second colored material.

4. A color display according to claim 1 wherein the first area is covered by a colored material, and the second area is covered less densely by the same colored material.

5. A color display according to claim 1 comprising a plurality of said first and second areas, said plurality of first and second areas being arranged in a checkerboard pattern.

6. A color display according to claim 1 wherein the color filter array is disposed on the opposed side of the electro-optic layer from the front electrode.

7. A color display according to claim 6 wherein the color filter array is disposed between the front and rear electrodes.

8. A color display according to claim 6 wherein the color filter array forms part of the rear electrode layer.

9. An electronic book reader, portable computer, tablet computer, cellular telephone, smart card, sign, watch, shelf label, variable transmission window or flash drive comprising a display according to claim 1.

10. A color display comprising a color filter array with a resistivity of less than about $10^{12}$ ohm cm, a front electrode, at least one rear electrode, and an electro-optic medium disposed between the front and rear electrodes, wherein the color filter array is disposed on the opposed side of the electro-optic layer from the front electrode.

11. A color display according to claim 10 wherein the color filter array has a resistivity of less than about $10^{10}$ ohm cm.

12. A color display according to claim 11 wherein the color filter array has a resistivity of less than about $10^{6}$ ohm cm.

13. A color display according to claim 10 wherein the color filter array forms part of the rear electrode layer.

14. An electronic book reader, portable computer, tablet computer, cellular telephone, smart card, sign, watch, shelf label, variable transmission window or flash drive comprising a display according to claim 10.

15. A color electro-optic display comprising a front electrode, an electro-optic medium, and a backplane, the color display comprising at least one color pixel comprising a plurality of independently addressable sub-pixels, the backplane comprising a plurality of sub-pixel electrodes wherein at least one sub-pixel electrode has first and second areas with substantially different optical properties, the resistivity of the backplane being less than about $10^{12}$ ohm cm at room temperature.

16. A backplane according to claim 15 wherein the first area is covered by a colored material, and the second area is not covered by a colored material.

17. A backplane according to claim 15 wherein the first area is covered by a first colored material, and the second area is covered by a second colored material.

18. A backplane according to claim 15 wherein the first area is covered by a colored material, and the second area is covered less densely by the same colored material.

19. A backplane according to claim 15 comprising a plurality of said first and second areas, said plurality of first and second areas arranged in a checkerboard pattern.

20. A color electro-optic display having a viewing surface and comprising:
    a layer of electro-optic material having a first and second substantially opaque optical states, the first and second substantially opaque optical states differing in color, the layer of electro-optic material also having a light-transmissive state;
    a plurality of electrodes each arranged to apply an electric field to the layer of electro-optic material so as to drive the electro-optic material to its first and second substantially opaque optical states, and to its light-transmissive state, said plurality of electrodes defining at least one color pixel comprising a plurality of independently addressable sub-pixels;
    and a color filter array display disposed on the opposed side of the layer of electro-optic material from the viewing surface;
    the color filter array comprising sub-pixel areas of at least two differing colors;
    wherein the sub-pixel areas of at least one color in the color filter array comprise a fluorescent or phosphorescent material capable of emitting light of substantially the same color as that of the sub-pixel area in which the fluorescent or phosphorescent material is incorporated.

21. An electrophoretic display having a viewing surface, a layer of electrophoretic material, and a light-absorbing layer disposed on the opposed side of the layer of electrophoretic material from the viewing surface;
    wherein the layer of electrophoretic material comprises light-reflecting particles disposed in a colored fluid, the layer of electrophoretic material having at least one pixel comprising first and second sub-pixels wherein the colored fluids differ in color;
    wherein the electrophoretic display also comprises at least two electrodes each arranged to apply an electric field to one sub-pixel of the layer of electro-optic material so as to drive each of the sub-pixels of the layer of electrophoretic material to three optical states, namely
    (a) a first optical state in which the light-reflecting particles lie adjacent the viewing surface so that the sub-pixel displays a white optical state at the viewing surface;
    (b) a second optical state in which the light-reflecting particles are spaced from the viewing surface and the color of the fluid is displayed at the viewing surface; and
    (c) a third optical state in which the light-reflecting particles occupy only a minor proportion of the area of the sub-pixel, so that the light absorbing layer is visible through the layer of electrophoretic medium so that a dark color is displayed at the viewing surface;
    and wherein at least one sub-pixel of the display has a fluorescent or phosphorescent material incorporated in the fluid of the layer of electrophoretic material.

* * * * *